United States Patent
Hayashi et al.

(10) Patent No.: US 6,238,717 B1
(45) Date of Patent: May 29, 2001

(54) INCREASED STABILITY COTTAGE CHEESE PRODUCT

(75) Inventors: David K. Hayashi, Chicago; Kaiser Rajinder Nauth, Wheeling, both of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/480,744

(22) Filed: Jan. 10, 2000

Related U.S. Application Data

(60) Provisional application No. 60/117,569, filed on Jan. 27, 1999.

(51) Int. Cl.[7] .......................... A23C 19/076; A23C 19/10
(52) U.S. Cl. .......................... 426/326; 426/324; 426/128; 426/334; 426/582
(58) Field of Search .................. 426/324, 330.2, 426/326, 582, 334, 128

(56) References Cited

U.S. PATENT DOCUMENTS

| | | | |
|---|---|---|---|
| 2,962,379 | * 11/1960 | Leber et al. | 426/324 |
| 4,511,590 | 4/1985 | Caldwell | 426/580 |
| 4,701,329 | * 10/1987 | Nelson et al. | 426/330.2 |
| 5,232,720 | 8/1993 | Nielsen | 426/39 |
| 6,039,986 | * 3/2000 | Chandrasekhar et al. | |

FOREIGN PATENT DOCUMENTS

| | | | |
|---|---|---|---|
| 0 812 544 | 12/1997 | (EP) . | |
| 58-40041 | * 3/1983 | (JP) | 426/582 |

OTHER PUBLICATIONS

J. Dairy Science 74(1), 1–7. (Dialog Commercial Data Base Abstract, 07904992, Item 1 from File:5), 1991.*
Techpak (Toledo), 21(21), p. 3 (Dialog Commerc. Data Base Abstract, 280779, Item 1 from File: 79), Oct. 29, 1997.*

* cited by examiner

*Primary Examiner*—Steven Weinstein
(74) *Attorney, Agent, or Firm*—Fitch, Even, Tabin & Flannery

(57) ABSTRACT

An improved cottage cheese product have increased shelf life is provided. A relatively small amount of calcium carbonate is added to the dressing. The calcium carbonate-containing dressing is then blended with cottage cheese curd to form the improved cottage cheese product which is then packed into individual containers. At the pH of the cottage cheese product, the calcium carbonate is converted to carbonic acid which is then converted to carbon dioxide, normally over about a two week period at refrigeration temperatures within the package. Conventional cold pack cottage cheese has an average shelf life of about 20 to about 30 days at refrigeration temperatures. The improved cottage cheese described herein has an average shelf life of about 30 to 40 days or longer at refrigeration temperatures. The increased stability is obtained without loss of organoleptic properties and without extensive process modifications.

15 Claims, 1 Drawing Sheet

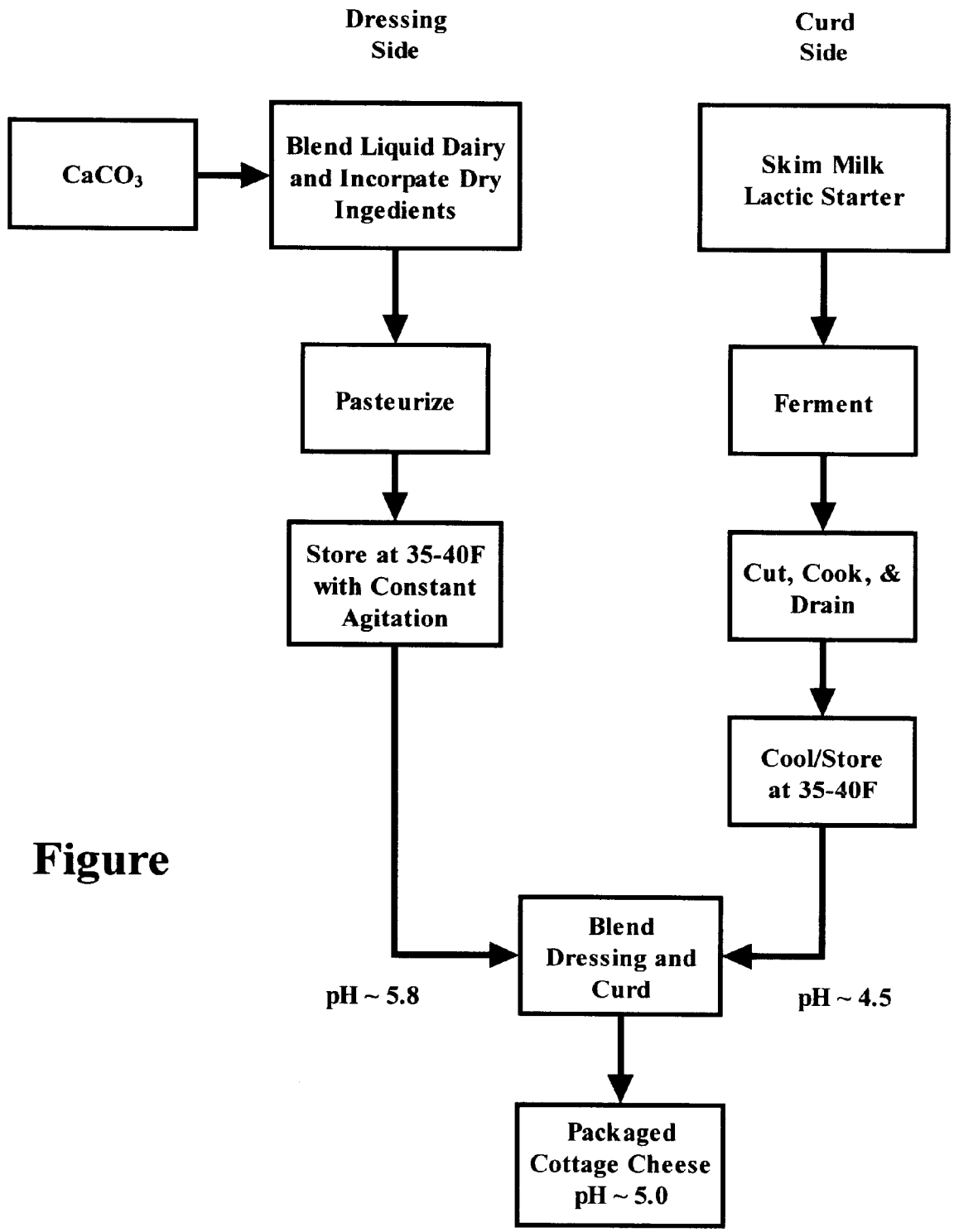
Figure

INCREASED STABILITY COTTAGE CHEESE PRODUCT

RELATED APPLICATION

This application is based on, and claims benefit of, U.S. Provisional Application Ser. No. 60/117,569, filed on Jan. 27, 1999.

BACKGROUND OF THE INVENTION

The present invention relates generally to cottage cheese products and, more particularly, to cottage cheese products having extended shelf-life. More specifically, the present invention relates to method of making cottage cheese in which calcium carbonate, added via the dressing, is converted to carbonic acid and then carbon dioxide within the packaged cottage cheese. The carbon dioxide generated in situ provides a more stable cottage cheese product without affecting the organoleptic and other desirable properties of the cottage cheese product.

DESCRIPTION OF THE PRIOR ART

Cottage cheese is a soft, mild acid-coagulated uncured cheese made primarily from a milk source (e.g., pasteurized reduced fat or skim milk). Cottage cheese is essentially relatively small pieces of cheese curd suspended in a creamy dressing. Cottage cheese, and especially reduced-fat or non-fat cottage cheese, are an important items in the diets of many consumers.

Unfortunately, cottage cheese products are significantly more perishable than other cheeses or cheese products. Thus, even with the addition of conventional preservatives, they are normally shipped and stored at refrigerated temperatures in order to prolong their shelf-life. An unopened, cold processed cottage cheese generally has a shelf-life of about 20 to about 30 days at refrigerator temperatures. Once opened by the consumer, even when stored in the coldest part of the refrigerator, the shelf-life can be even further decreased. Because of the short shelf life, cottage cheese cartons or containers are usually printed with an expiration date.

It would be highly desirable, therefore, to provide cottage cheese products having longer shelf-life. In particular, it would be desirable to provide cottage cheese products having shelf-life of about 30 to 40 days or even longer at typical refrigerator temperatures. Moreover, it would be highly desirable if such improved shelf-life could be obtained without sacrificing the desired organoleptic properties and/or without requiring significant process modifications. It would also be desirable to provide cottage cheese products having an increased margin of safety for the consumer.

SUMMARY OF THE INVENTION

One object of the present invention is to provide cottage cheese products having increased shelf-life. Another object of the present invention is to provide cottage cheese products which are adapted for storage at refrigeration temperatures for longer periods of time without substantial microbiological deterioration. Another object of the present invention is to provide such cottage cheese products having increase shelf-life without sacrificing desired properties. It is still another object of the present invention to provide a method for making nutritious, palatable cottage cheese products, which are capable of storage for longer periods of time at refrigeration temperatures without substantial microbiological deterioration. It is a still further object of the present invention to a method for producing such cottage cheese products without significant process modifications. Still another object is to provide cottage cheese products having reduced risk of spoilage and thus providing increased margins of safety for the consumer. These and other objects and advantages of the present invention will be apparent from the following description and the appended claims.

The present invention provides a process for preparing a packaged cottage cheese product having an increased shelf life, said process comprising (1) preparing a cottage cheese dressing having about 0.05 to about 0.30 percent calcium carbonate at a pH of about 5.6 to about 6.0; (2) preparing a cottage cheese curd at a pH of about 4.0 to about 4.8; (3) blending the cottage cheese dressing and the cottage curd fat to form a cottage cheese product; and (4) packaging the cottage cheese product; wherein under the pH conditions in, or developed in, the packaged cottage cheese product, at least a portion of the calcium carbonate is converted to carbonic acid and wherein at least a portion of the carbonic acid is converted to carbon dioxide; and whereby the shelf life of the packaged cottage cheese product is at least about 38 days at refrigerated temperatures. Using the process of this invention, calcium carbonate is included in the cottage cheese dressing at a pH of about 5.6 to about 6.0, preferably about 5.7 to about 5.8, and most preferably about 5.8. Under these pH conditions, the calcium carbonate is stable (i.e., not appreciably converted to carbonic acid). Once combined with the cottage cheese curd, the pH will drop into the range of about 4.8 to about 5.2. At these lower pH conditions, the calcium carbonate will be converted to carbonic acid and then ultimately to carbon dioxide. If packaged shortly after the cottage cheese dressing and the cottage cheese curd are blended together, the conversion of calcium carbonate to carbonic acid and the conversion of the resulting carbonic acid to carbon dioxide will take place within the package over a period of time (approximately 2 to 3 weeks at a temperature of about 35 to about 40° F.). The conversion of calcium carbonate to carbonic acid to carbon dioxide in situ provides a significantly increased shelf life and/or provides a significantly increased margin of safety for the packaged cottage cheese. Generally, the resulting packaged cottage cheese will have a shelf life of at least about 38 days at refrigeration temperatures. This shelf life represents a significantly longer shelf life as compared with conventional commercial cold pack cottage cheese (i.e., about 20 to about 30 days). Alternatively, for the same aged product, the cottage cheese product of this invention provides a significantly lower risk, and a significantly higher margin of safety, as compared to conventional cottage cheeses. In other words and for example, a 28-day old cottage cheese of the present invention will have a significantly reduced risk of spoilage as compared to a 28-day old conventional cottage cheese. Moreover, this improvement in shelf life and/or increase margin of safety is obtained without significantly affecting the organoleptic properties of the cottage cheese or without significantly modifying the cottage cheese manufacturing process.

This invention also provides a cottage cheese product comprising (1) a cottage cheese dressing containing about 0.05 to 0.30 percent calcium carbonate and (2) a cottage cheese curd; wherein the cottage cheese dressing and cottage cheese curd are blended together and wherein the calcium carbonate is slowly converted to carbonic acid and carbon dioxide in the cottage cheese product. Preferably the cottage cheese product contains about 35 to about 45 percent cottage cheese dressing and about 55 to about 65 percent cottage cheese curd. Preferably, the pH of the cottage cheese dressing before blending is about 5.6 to about 6.0; the pH of the cottage cheese curd before blending is about 4.0 to about 4.8; and the pH of the cottage cheese product is about 4.8 to about 5.2.

BRIEF DESCRIPTION OF THE DRAWING

The FIGURE provides a schematic diagram of the process of this invention for the production of a more stable cottage cheese product.

DETAILED DESCRIPTION OF THE INVENTION

The cottage cheese products of the present invention are prepared by adding a small amount of calcium carbonate to the cottage cheese product under conditions (i.e., a pH of about 4.8 to about 5.2) whereby the calcium carbonate is slowly converted to carbonic acid and the carbonic acid is then slowly converted to carbon dioxide. Preferably, such in situ conversion to carbonic acid and carbon dioxide takes place in the packaged cottage cheese. Although not wishing to be limited to theory, it is probably the gradual evolution of carbonic acid that is responsible for the increased shelf life of the present cottage cheese products. Nonetheless, the gradual evolution of carbon dioxide may also play a role. The cottage cheese products that can be prepared using the process of this invention include full fat, reduced fat, and fat free cottage cheese products. Generally, however, the preparation of reduced fat and fat free cottage cheese products are preferred.

Preferably the calcium carbonate is added to the dressing or cream ingredients on the "dressing side" of the process as shown in the FIGURE. Calcium carbonate is generally added to the dressing in an amount to provide a concentration of about 0.01 to about 0.15 percent, preferably about 0.05 to 0.07 percent, and more preferably about 0.060 percent in the final, packaged cottage cheese product. Moreover, it is generally preferred that the added calcium carbonate is added as a fine powder to order to insure a more homogenous distribution throughout the resulting cottage cheese product. Such a fine powder will also help prevent a "gritty" texture should the cottage cheese product be consumed prior to essentially complete conversion of the calcium carbonate to carbonic acid and/or carbon dioxide. Generally, the particle size of the calcium carbonate is less than about 2.6 microns, preferably about 2.6 to 0.8 microns, and more preferably about 1.7 to about 1.9 microns. Of course the calcium carbonate should be a food-grade material. Although other forms of calcium carbonate may be used, precipitated calcium carbonate is generally preferred.

The cottage cheese products of this invention may also contain conventional additives such as, for example, antimycotic agents, preservatives, anti-oxidants, flavorings, colorants, and the like. For example, antimycotic compounds or preservatives which may be utilized in accordance with the present invention include potassium sorbate, sorbic acid, benzoic acid, sodium benzoate, calcium propionate, or mixtures thereof. Such agents, if used, are normally added in an amount of about 0.05 to about 0.2 percent. Additives that may decrease the pH should normally be added to the curds to avoid premature conversion of the calcium carbonate in the cottage cheese dressing. Any such additives should not, of course, adversely effect the organoleptic properties (e.g., flavor, texture, mouthfeel, and the like). The selection of such additives, and their amounts, are within the ordinary skill in the art.

One preferred process for producing the more stable cottage cheese of the present invention is illustrated in the Figure. As indicated in the FIGURE, the process can be divided into the "dressing side" or part of the process and the "curd side" or part of the process. Considering first the dressing side, liquid dairy products, including for example, skim milk, condensed skim milk, and cream, are blended with the dry ingredients, including, for example, calcium carbonate, salt, and food starch. The amount of calcium carbonate added to the dressing is preferably about 0.05 to about 0.30 percent; this level provides about 0.0175 to about 0.135 percent calcium carbonate in the packaged cottage cheese product before any conversion to carbonic acid or carbon dioxide takes place. The blended ingredients are then pasteurized under conventional pasteurization conditions (e.g., about 164 to about 167° F. for about 15 to 30 seconds). After pasteurization, the dressing is cooled to about 35 to about 45° F., preferably about 40° F., and held until blending with the cottage cheese curd. Preferably, the cooled dressing is maintained under continuous mixing or agitation to prevent settling of any insoluble or partially soluble components. The pH of the dressing is generally about 5.6 to about 6.0, preferably about 5.7 to about 5.8, and most preferably about 5.8.

The preparation of the cottage cheese curd is illustrated on the "curd side" of the FIGURE. The cottage cheese curd can be prepared before, after, or during the preparation of the dressing. Using conventional techniques, pasteurized liquid milk (preferably reduced fat or skim milk) is blended with a suitable lactic acid starter in a cheese vat. One preferred lactic acid starter is a culture of *Lactococcus lactis* and *Lactococcus cremoris*. Preferably, about 0.5 to about 5.0 percent, and more preferably, about 1 to about 1.5 percent of the lactic acid bulk starter culture or an equivalent direct set starter is added to the pasteurized liquid milk. The mixture is then fermented or incubated at a temperature of about 80 to about 100° F., preferably at about 90° F., until a pH of about 4.6 is reached (i.e., the milk has set). Generally, the fermentation is carried out for about 4 to about 7 hours. Once the milk has set (i.e., the curd has formed), the curd is cut and then cooked, for example, at a temperature of starting at about 120 and rising to about 140° F. After cooking, the curd is drained and then washed using chlorinated (about 8 ppm) ice water. Once cooled to about 40° F., the curd is drained. The cooled, drained curd can be used immediately or held at about 40° F. until needed.

The cooled curd and cooled dressing (both at about 35 to about 40° F.) are then blended gently together while maintaining the temperature at about 35 to about 40° F. Preferably a low-shear device such as a ribbon type blender is used. Generally, about 35 to about 45 percent dressing and about 55 to about 65 percent curd are used. After blending (normally for about 5 to 15 minutes), the resulting cottage cheese product is packaged in suitable, and preferably sealable, containers and stored at suitable refrigeration temperatures. At packing, the pH will normally be in the range of about 4.8 to about 5.2. After such cold packing, the pH of the cottage cheese will normally decrease to about 4.6 to about 4.8. During storage (up to an estimated 2 weeks after packing), the calcium carbonate will slowly be converted to carbonic acid which will then slowly be converted to carbon dioxide. Of course the kinetics of the conversion processes will be effected by the storage temperature. Generally, the storage temperature should be in the range of about 35 to about 48° F. to provide the highest margin of safety.

Although the calcium carbonate is shown being added in the initial blending step on the "dressing side" in the FIGURE, it could be added to the dressing at any time before, or even during, the blending step where the dressing and curd are combined. Generally, however, it is preferred that the calcium carbonate be added at the initial blend step on the dressing side since this will allow more homogeneous distribution in the final packaged cottage cheese product and also subject all dressing components to pasteurization. Although the calcium carbonate can be added just before or during the final blending step where the dressing and curd are combined, it may be difficult to achieve homogenous distribution of the calcium carbonate without adversely effecting the structure of the curd.

Although the packing material or container can be gas permeable, it is generally preferred that the packaging material or container is essentially gas impermeable so that the generated carbon dioxide remains within the package or container. The amount of calcium carbonate added is generally not enough to significantly raise the pressure inside such impermeable packaging. More preferably, the packaging materials or container should also be opaque to help reduce oxidative or light induced deterioration.

Alternatively, cottage cheese can also be prepared using direct acidification of milk using, for example, anhydrides such as mesolactide and glucono-δ-lactone or acids such as hydrochloric and phosphoric acids. In such direct acidification processes, the acidified milk is held at about 4° C. until the mixture is below the ioselectric point of casein. If desired, rennet can be used to achieve a more rapid set. The curd is cut and cooked in the normal manner. Such curd is suitable for use in the present process.

The shelf-life of the cottage cheese products of the present invention at normal refrigeration temperatures will be in the range of about 30 to 40 days or longer. Moreover, over any given time period and under various conditions, the cottage cheese of the present invention will exhibit less deterioration or spoilage than a conventional cottage cheese product without added calcium carbonate. In other words, the cottage cheese of this invention will have a reduce risk of spoilage as compared to conventional cottage cheese of the same age and will, therefore, provide an increased safety margin for the consumer.

The following examples are provided to illustrate the invention and not to limit it. Unless otherwise noted, all percentages throughout the specification, including the examples, are by weight.

EXAMPLE 1

This example illustrate the preparation of a low-fat cottage cheese product containing calcium carbonate. A cottage cheese dressing was prepared by blending the following ingredients:

| Ingredient | Percentage |
| --- | --- |
| Skim Milk | 65.5 |
| Condensed Skim Milk | 19.0 |
| Cream | 10.8 |
| Salt | 1.9 |
| Tapioca Starch | 2.5 |
| Calcium Carbonate | 0.15–0.25 |
| Vitamin A Palmitate | 0.02 |

The calcium carbonate used was precipitated USP grade having an average particle size of about 1.8 microns and a specific gravity of about 2.7.

After blending the dressing ingredients, the dressing was pasteurized at about 164 to about 167° F. for about 16 to about 25 seconds. The pasteurized dressing was then cooled to about 40° F. and held at that temperature, with gentle agitation, until combined with the cottage cheese curd.

In a cheese vat, pasteurized skim milk containing about 1.3 percent lactic acid bulk starter (i.e., Lactococcus lactis and Lactococcus cremoris) and about 0.004 percent annatto (for coloring) was fermented at about 90° F. Fermentation was continued until a pH of about 4.6 was obtained. The resulting curd was then cut with cheese knives (⅜ inch spacing). After cutting, steam was injected until the temperature reached about 120° F., at which point the steam was discontinued. About 15 minutes later, steam was reintroduced until the temperature reached about 140° F. The 140° F. temperature was maintained for about 15 minutes. After draining the whey, the curd was cooled and washed with chlorinated (about 8 ppm) ice water until the temperature of the curd was reduced to about 40° F. The curd was then drained.

The dressing (40 percent; pH about 5.8) and the curd (60 percent; pH about 4.6), both at about 40° F., were then blended in a ribbon mixture for about 10 minutes. After blending, the cottage cheese product was packed (i.e., cold packed cottage cheese). Generally, the product was packed in 16 oz. polystyrene cups (about ¾ full) so headspace gas analysis could be carried out. The packed and sealed containers were stored at about 45° F.

Control samples were prepared in essentially the same manner except that no calcium carbonate was added.

EXAMPLE 2

Dressing and curd were prepared as in Example 1 and analyzed before and after blending together. The following analytical results were obtained.

Dressing

| | Dressing | |
| --- | --- | --- |
| | Control | Inventive |
| pH | 5.81 | 5.77 |
| Titratable Acid | 0.32% | 0.33% |
| Total Calcium | 1370 ppm | 2000 ppm |
| Ionic Calcium | 0.1442% | 0.1229% |
| Fat | 3% | 4.2% |
| Salt | 2.16% | 2.03% |
| Moisture | 76.2% | 80.3% |

The curd, which was the same for both control and experimental samples, had a pH of about 4.0 to about 4.5, about 18 to about 21 percent moisture, and less than about 0.5 percent fat. The cottage cheese product, formed by blending about 40 percent dressing and 60 percent curd at 40° F., had the following analysis.

| | Cottage Cheese Product | |
| --- | --- | --- |
| | Control | Inventive |
| pH | 5.04 | 5.09 |
| Total Calcium | 815 ppm | 944 ppm |
| Fat | 1.8% | 1.7% |
| Salt | 0.96% | 0.85% |
| Moisture | 80.6% | 82.0% |

EXAMPLE 3

Both inventive and control cottage cheese products were prepared as in Example 1 and packaged into 16 oz. polystyrene cups (about ¾ full) and stored at 40° F. The headspace gases were measured as a function of time. The following results were obtained:

| | Carbon Dioxide | | |
|---|---|---|---|
| | 1 day | 1 week | 2 weeks |
| Control | N.D. | N.D. | N.T. |
| Inventive | 2.1% | 1.3% | 1.1% |

"N.D." indicates that carbon dioxide was not detected; "N.T." indicates that the sample was not analyzed.

EXAMPLE 4

Control and inventive cottage cheese products were prepared as in Example 1. These products were stored at about 40° F. and then periodically sampled using a test panel which evaluated several sensory characteristic (i.e., overall liking, overall flavor, overall texture). Results were based on a 1 to 9 scale with 1 being "disliked extremely" and 9 being "liked extremely." Samples tested at 14 days were "in code"; samples at 38 and 48 days were extended 10 and 20 days, respectively, past "code" (i.e., past the normal expiration date of 28 days for cottage cheese). The following results were obtained:

| | Control Samples | | | |
|---|---|---|---|---|
| Time Evaluated | Overall Liking | Overall Flavor | Overall Texture | Number of Testers |
| 14 days | 6.5 | 6.5 | 6.7 | 156 |
| 38 days | 6.5 | 6.5 | 6.7 | 153 |
| 48 days | 6.8 | 6.7 | 6.8 | 159 |

| | CaCO$_3$-Containing Samples | | | |
|---|---|---|---|---|
| Time Evaluated | Overall Liking | Overall Flavor | Overall Texture | Number of Testers |
| 14 days | 6.8 | 6.9* | 6.7 | 156 |
| 38 days | 6.5 | 6.5 | 6.5 | 153 |
| 48 days | 7.1 | 7.1* | 7.2* | 159 |

Inventive samples marked with an asterisk indicate a difference between the control and the inventive samples at an 80 percent confidence level.

EXAMPLE 4

Both control and inventive samples were prepared as described in Example 1 and then stored at 40° F. Samples were examined at both 28 and 38 days after preparation for visible microbial growth on the product surface. The following results were obtained:

| | Control | | | Inventive | | |
|---|---|---|---|---|---|---|
| Time Evaluated | Spoiled Samples | Total Samples | % Spoiled | Spoiled Samples | Total Samples | % Spoiled |
| 28 days | 19 | 744 | 2.55 | 3 | 1080 | 0.28 |
| 38 days | 28 | 720 | 3.89 | 3 | 1080 | 0.19 |

These results show a significant reduction in the number and percentage of spoiled samples using calcium carbonate.

While the present invention has been particularly described with reference to the specific embodiments set forth above, it should be understood that numerous modifications may be made by those skilled in the art without departing from the scope and spirit of the invention hereinafter claimed.

What is claimed is:

1. A process for preparing a packaged cottage cheese product having an increased shelf life, said process comprising
    (1) preparing a cottage cheese dressing having about 0.05 to about 0.30 percent calcium carbonate at a pH of about 5.6 to about 6.0;
    (2) preparing a cottage cheese curd at a pH of about 4.0 to about 4.8;
    (3) blending the cottage cheese dressing and the cottage cheese curd together to form a cottage cheese product; and
    (4) packaging the cottage cheese product so that after packaging, the pH of the cottage cheese curd reduces the pH of the cottage cheese product to a range which, during refrigerated storage of the cottage cheese product in the package, will cause the calcium carbonate to slowly be converted to carbonic acid which will then slowly be converted to carbon dioxide sufficient to increase the shelf life and reduce the risk of spoilage of the cottage cheese product compared to cottage cheese not containing calcium carbonate.

2. A process as defined in claim 1, wherein the shelf life of the packaged cottage cheese product is at least about 30 days at refrigerated temperatures.

3. A process as defined in claim 2, wherein the pH in the packaged cheese cottage product is about 4.8 to about 5.2.

4. A process as defined in claim 3, wherein the packaged cottage cheese is formed by blending about 35 to about 45 percent cottage cheese dressing and about 55 to about 65 percent cottage cheese curd.

5. A process as defined in claim 4, wherein the calcium carbonate has a particle size of about 1.7 to about 1.9 microns.

6. A process as defined in claim 1, wherein the pH in the packaged cottage cheese product is about 4.8 to about 5.2.

7. A process as defined in claim 6, wherein the packaged cottage cheese is formed by blending about 35 to about 45 percent cottage cheese dressing and about 55 to about 65 percent cottage cheese curd.

8. A process as defined in claim 7, wherein the calcium carbonate has a particle size of about 0.8 to about 1.9 microns.

9. A process as defined in claim 1, wherein the calcium carbonate has a particle size of about 0.8 to about 2.6 microns.

10. A packaged cottage cheese product comprising a package containing a cottage cheese product, said cottage cheese product comprising (1) a cottage cheese dressing containing about 0.0175 to 0.135 percent calcium carbonate and (2) a cottage cheese curd blended together with the cottage cheese dressing, the cottage cheese dressing prior to blending with the curd having a pH at which the calcium carbonate is stable, the cottage cheese curd having a pH prior to blending that is less than the pH of the dressing, such that the pH of the cottage cheese curd reduces the pH of the cottage cheese product to a range which, during refrigerated storage of the cottage cheese product in the package, will cause the calcium carbonate to slowly be converted to carbonic acid which will then slowly be converted to carbon dioxide sufficient to increase the shelf life and reduce the risk of spoilage of the cottage cheese product compared to cottage cheese not containing calcium carbonate.

11. A cottage cheese product as defined in claim 10, wherein the cottage cheese dressing is present in about 35 to about 45 percent and the cottage cheese curd is present in about 55 to about 65 percent.

12. A cottage cheese product as defined in claim 11, wherein the calcium carbonate has a particle size of about 0.8 to about 2.6 microns.

13. A cottage cheese product as defined in claim 10, wherein the pH of the cottage cheese dressing before blending is about 5.6 to about 6.0; wherein the pH of the cottage cheese curd before blending is about 4.0 to about 4.8; and wherein the pH of the cottage cheese product is about 4.6 to about 5.2.

14. A cottage cheese product as defined in claim 13, wherein the calcium carbonate has a particle size of about 0.8 to about 1.9 microns.

15. A cottage cheese product as defined in claim 10, wherein the calcium carbonate has a particle size of about 0.8 to about 1.9 microns.

* * * * *